United States Patent
Wilcox

(10) Patent No.: US 10,624,496 B1
(45) Date of Patent: Apr. 21, 2020

(54) GRILL WITH INTERCHANGEABLE GRILL COVER

(71) Applicant: Clifton Wayne Wilcox, Fredericksburg, VA (US)

(72) Inventor: Clifton Wayne Wilcox, Fredericksburg, VA (US)

( * ) Notice: Subject to any disclaimer, the term of this patent is extended or adjusted under 35 U.S.C. 154(b) by 83 days.

(21) Appl. No.: 16/145,096

(22) Filed: Sep. 27, 2018

(51) Int. Cl.
*A47J 37/07* (2006.01)
*A47J 37/00* (2006.01)
*F24B 7/04* (2006.01)

(52) U.S. Cl.
CPC ....... *A47J 37/0786* (2013.01); *A47J 37/0704* (2013.01); *A47J 37/0763* (2013.01); *A47J 37/00* (2013.01); *F24B 7/04* (2013.01)

(58) Field of Classification Search
CPC .............. A47J 37/00; A47J 37/07; F24B 7/04
USPC ....................................................... 126/25 R
See application file for complete search history.

(56) References Cited

U.S. PATENT DOCUMENTS

| 4,463,746 | A * | 8/1984 | Knuth ................. | A47J 37/0763 126/25 R |
| 6,935,327 | B1 * | 8/2005 | Williams ................ | A47J 36/06 126/19 R |
| 7,383,836 | B2 * | 6/2008 | Klemming .............. | F24B 1/181 126/190 |
| 9,930,991 | B2 * | 4/2018 | Traeger ................ | A47J 37/0786 |
| 2004/0094141 | A1 * | 5/2004 | Herring ................... | A47J 36/12 126/25 R |
| 2009/0308373 | A1 * | 12/2009 | Scott ....................... | A47J 36/06 126/25 R |
| 2012/0003445 | A1 * | 1/2012 | Crain .................. | A47J 37/0786 428/210 |
| 2012/0318255 | A1 * | 12/2012 | Brown .................... | F23B 20/00 126/25 R |

* cited by examiner

*Primary Examiner* — Edelmira Bosques
*Assistant Examiner* — Nikhil P Mashruwala
(74) *Attorney, Agent, or Firm* — Attentive Law Group; Paul Ratcliffe

(57) ABSTRACT

A portable grill with an interchangeable grill lid to allow for different decorative lids to be screwed onto a universal base grill. The lid base sits on the grill body and screws into the body. The grill body includes a grill grate that fits all the different interchangeable grill lids. The interchangeable grill lids include various mascot and sports related designs.

6 Claims, 6 Drawing Sheets

GRILL WITH INTERCHANGEABLE GRILL COVER

BACKGROUND OF THE INVENTION

Field of the Invention

The present invention relates generally to a portable grill, and more particularly to a quick detachable grill lid.

SUMMARY OF THE INVENTION

This summary of the invention is provided to introduce concepts in a simplified form that are further described in the detailed description of the invention. This summary is not intended to identify key or essential inventive concepts of the claimed subject.

The invention includes a grill with an easily detached grill lid that comes in various designs to allow for an interchangeable grill lid. The detachable and interchangeable grill lid sits on a portable grill body and is mechanically fastened in a secure and removable configuration. The interchangeable grill lid allows a person to proclaim specific sports fandom, and allows the person to easily and quickly change the represented fandom based on the sport season. The detachable grill lid comes in various designs that support different sports and sports teams.

The present invention also provides a grill comprised of: a portable grill base; a grill body; a plurality of base edges on an upper portion of the grill body; the plurality of base edges having a plurality of base fastening points and a base lip located along the top edge of the plurality of base edges; a grill lid comprised of a lid base, a lower lid body and an upper lid body, the lid base having a plurality of lid edges on a lower portion of the lid base, the lid edges having a plurality of lid fastening points and a lid lip located along the top edge of the plurality of base edges. The plurality of base edges are configured to be placed adjacent to the plurality of lid edges with the lid lip resting on the base lip and the plurality of base fastening points mating with the plurality of lid fastening points. The grill having a hinge assembly connecting the lower lid body to the upper lid body; a grill lid latch located on the front of the upper lid body for latching the upper lid body to the grill base; and a grill grate that is configured to fit within the plurality of base edges. The grill lid may have one or more flat areas adjacent to the lid edges to connect the lower lid body to the edges. The grill lid has a hole formed by the lid base and lower lid body which creates an opening for grilling and is covered by the upper lid body when in a closed position. The grill may have a handle attached to the upper lid body. The handle may be configured to be a part of the latch assembly, such as a ring. Screws, bolts, nuts or other fastening elements may be used to fasten the grill lid to the grill base along the plurality of fastening points. The grill lid may be in the form of the head of a mascot.

These and other objects, features, and/or advantages may accrue from various aspects of embodiments of the present invention, as described in more detail below.

BRIEF DESCRIPTION OF THE DRAWINGS

Various exemplary embodiments of this invention will be described in detail, wherein like reference numerals refer to identical or similar components or steps, with reference to the following figures, wherein.

DETAILED DESCRIPTION OF EXEMPLARY EMBODIMENTS

Particular embodiments of the present invention will now be described in greater detail with reference to the figures.

Figure 1:
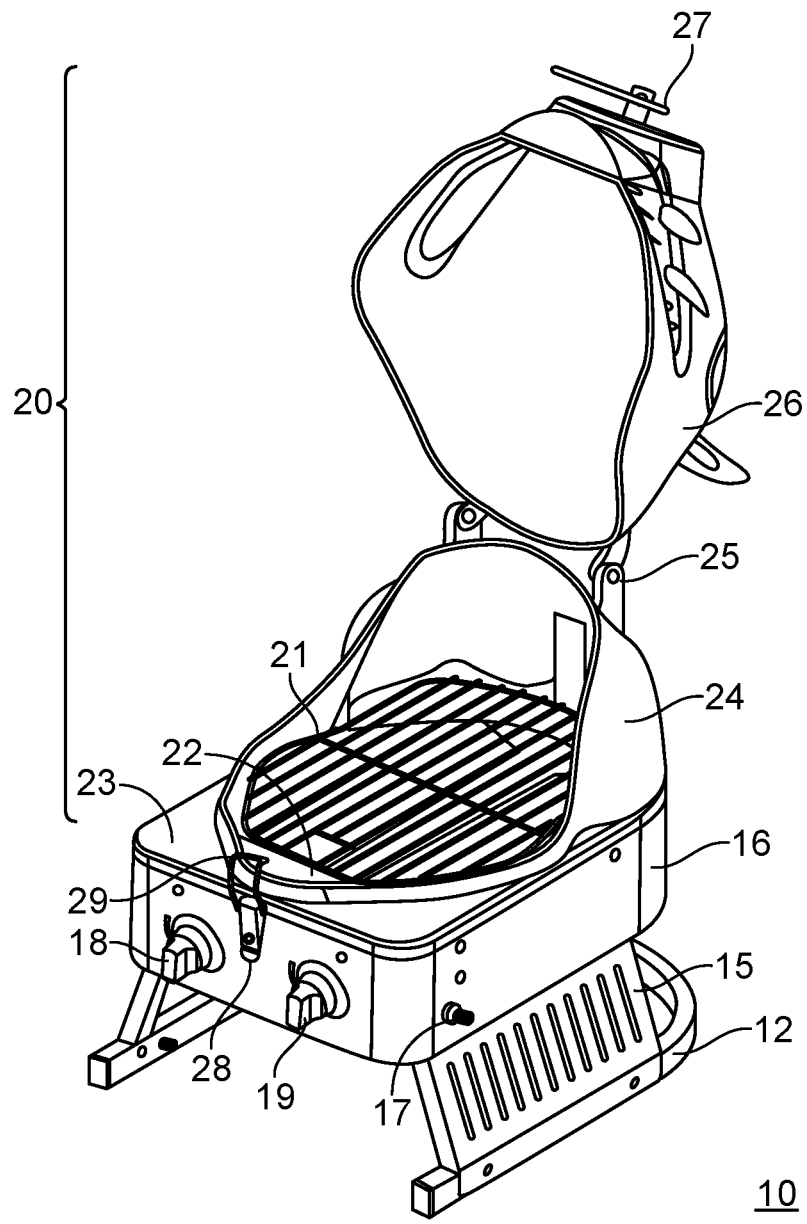
FIG. 1 shows an open view of an embodiment of the interchangeable grill head and the portable grill.

The present invention provides, as seen in FIG. 1, a portable grill 10 with an interchangeable grill lid 20 that comes in various shapes of different team mascots or avatars for specific sports. The grill lid 20 is comprised of the grill lid base 23 with flat sections at the edges of the base, the mascot lower section 24, and the mascot head 26. The grill lid 20 mates with and fastens to the grill body 16. The grill body 16 rest on a U-shaped base 12 and is attached to the base 12 by a slotted riser plate 15. The grill body 16 includes temperature control knobs 18 and 19 and a lighter switch 17. The grill body 16 has a latch body 28 and latch fastener 29 located in between temperature control knobs 18 and 19. The grill grate 21 lies on top of the grill body 16 and inside the hole 22 in grill lid base 23. The grill grate 21 shape is universal to the interchangeable grill lid 20 embodiments to easily fit on the grill body 16 with minimal changing parts. The design minimizes the pieces needed to be changed when a grill lid 20 is changed. The interchangeable grill lid 20 is easily unattached from the grill body 16 and replaced by an alternative design without need of the grill grate 21 being replaced.

The grill lid base 23 sits on top of the grill body 16 and is fastened using one or more mechanical fasteners. In the exemplary embodiment the grill uses screws (not depicted) threaded through screw holes 36 (FIGS. 3A and 3B) to secure the grill lid base 23 to the grill body 16. In an alternative embodiment, not pictured, the grill lid base 23 is fastened onto the grill body 16 using clamp latches. The clamp latches are located along the sides of the grill body 16. The grill lid base 23 has corresponding ledges located on each side of the grill lid base 23 to allow the latch fastener to hook onto the grill lid base 23. The mascot lower section 24 is fastened or welded onto the flat sections of the grill lid base 23. The mascot lower section 24 is attached to the mascot head 26 by hinge assembly 25. The hinge assembly 25 allows the mascot head 26 to rotate open and close by use of the grill lid head latch 27. The grill lid head latch 27 is attached or affixed to the front of the mascot head 26. In the illustrated example grill lid head latch 27 is attached at the snout of the mascot head 26. There are various iterations of the grill lid 20, and the location of the grill lid latch 27 is always at the front of the mascot head 26.

Figure 2:
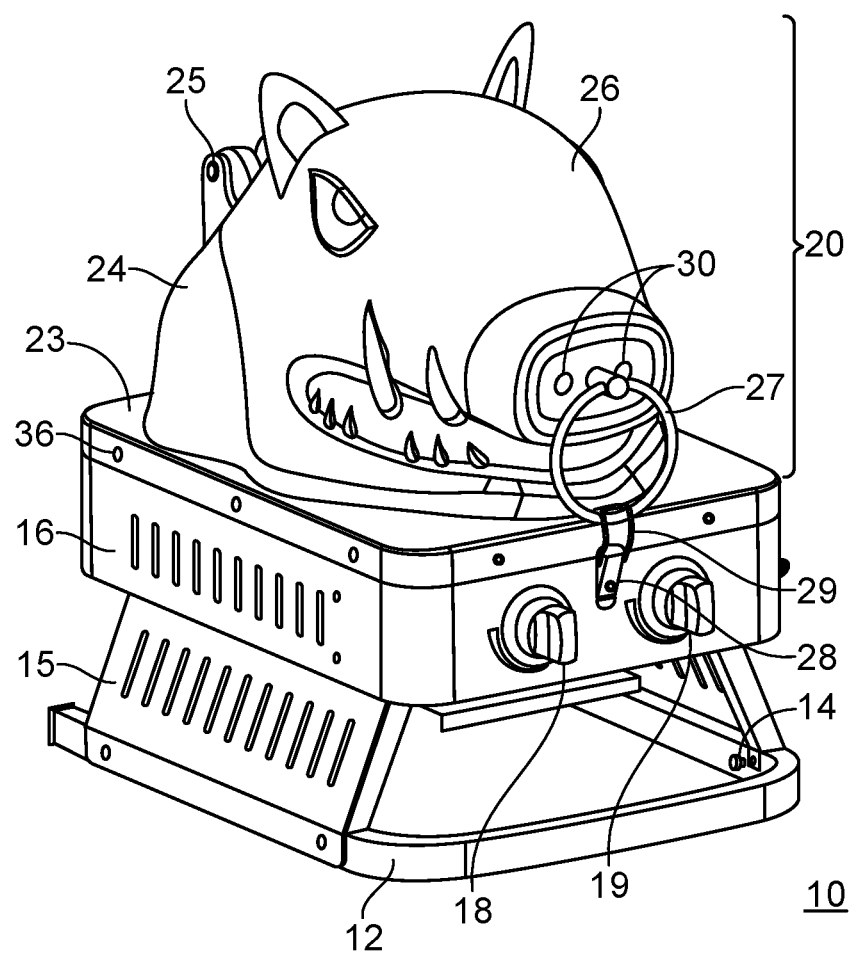
FIG. 2 shows the interchangeable grill head closed and secured onto the grill.

FIG. 2 shows another iteration of the portable grill 10 and the interchangeable grill lid 20. The grill body 16 is sitting on a U-shaped base 12 mounted using a slotted riser plate 15 connected to the base 12 by mechanical fastener 14. In the exemplary embodiment the grill lid base 23 is screwed to the grill body 16 using ten screws threaded through screw hole 36 located on the top of grill body 16 and corresponding holes on the four sides of the grill lid base 23. The hinge assembly 25 connects the mascot lower section 24 to the mascot head 26. The mascot head 26 when closed is held in place by latch body 28 and latch fastener 29 fastened to the grill lid latch 27. The mascot head 26 may also include venting holes 30.

Figure 3A:
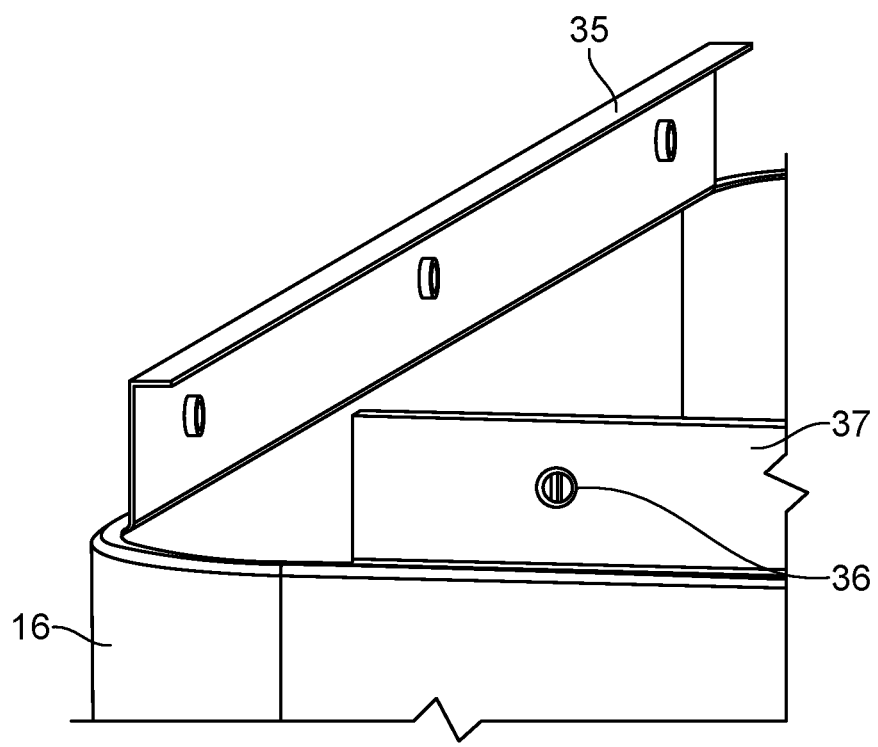
FIG. 3A shows the lip on the grill which allows the interchangeable grill head to fasten securely onto the base grill.
Figure 3B:
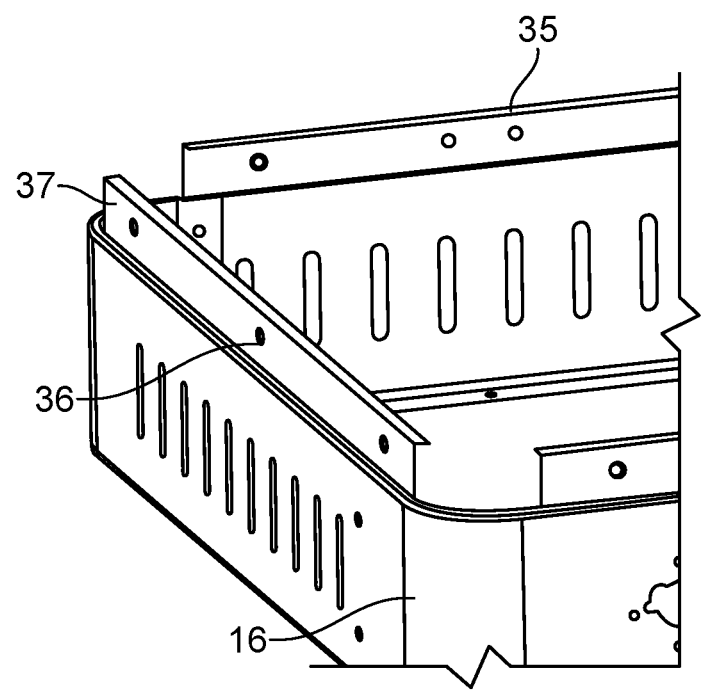
FIG. 3B shows an alternative embodiment of the lip on the grill body.

As seen in FIGS. 3A and 3B the lip 35 sits on the raised ledge 37 of the grill lid base 23. The lip 35 is the edge of the raised ledge 37 to allow the grill lid base 23 to rest on the lip 35 and line up with the screw holes 36. There are raised ledges 37 on each of the four sides of the upper grill body 16. The grill lid base 23 is placed on the lip 35 and mechanically attached using screw holes 36 located on the raised ledge 37. The lip 35 allow for easy placement of the grill lid base 23 on the grill body 16 is in use. In an alternative embodiment, there are no screw holes in raised ledge 37. There are clamp latches located below the raised ledge 37 on the grill body 16. These clamp latches will be latched onto the grill lid 20 to secure the grill lid 20 to the grill body 16.

The grill lid 20 is easily released and secured to the grill body 16 to allow for an interchangeable grill lid 20 of various designs. The interchangeable grill lid 20 comes in various mascot designs and allows for fans of different sports and teams to easily represent their fandom.

Figure 4:
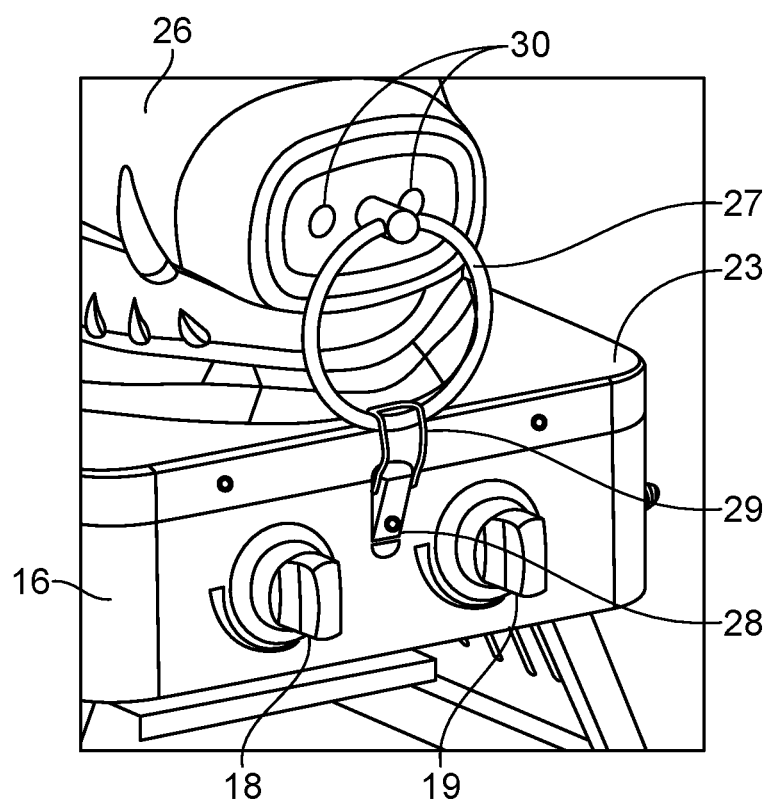
FIG. 4 shows a close up view of the clamp latch on the grill body.

FIG. 4 illustrates a close up view of the latch assembly which is comprised of a latch body 28 and latch fastener 29. The latch body 28 and latch fastener 29 are located on the front of grill body 16 in between the temperature control knobs 18, 19. The latch fastener 29 is configured to fasten to or mate with the grill lid latch 27, which may be in the form of a ring or handle fastened to the upper body 26 of the lid. The latch fastener 29 holds the grill closed when the grill 10 is being stored or transported; and the grill lid latch 27 is unfastened when the grill 10 is in use.

Figure 5:
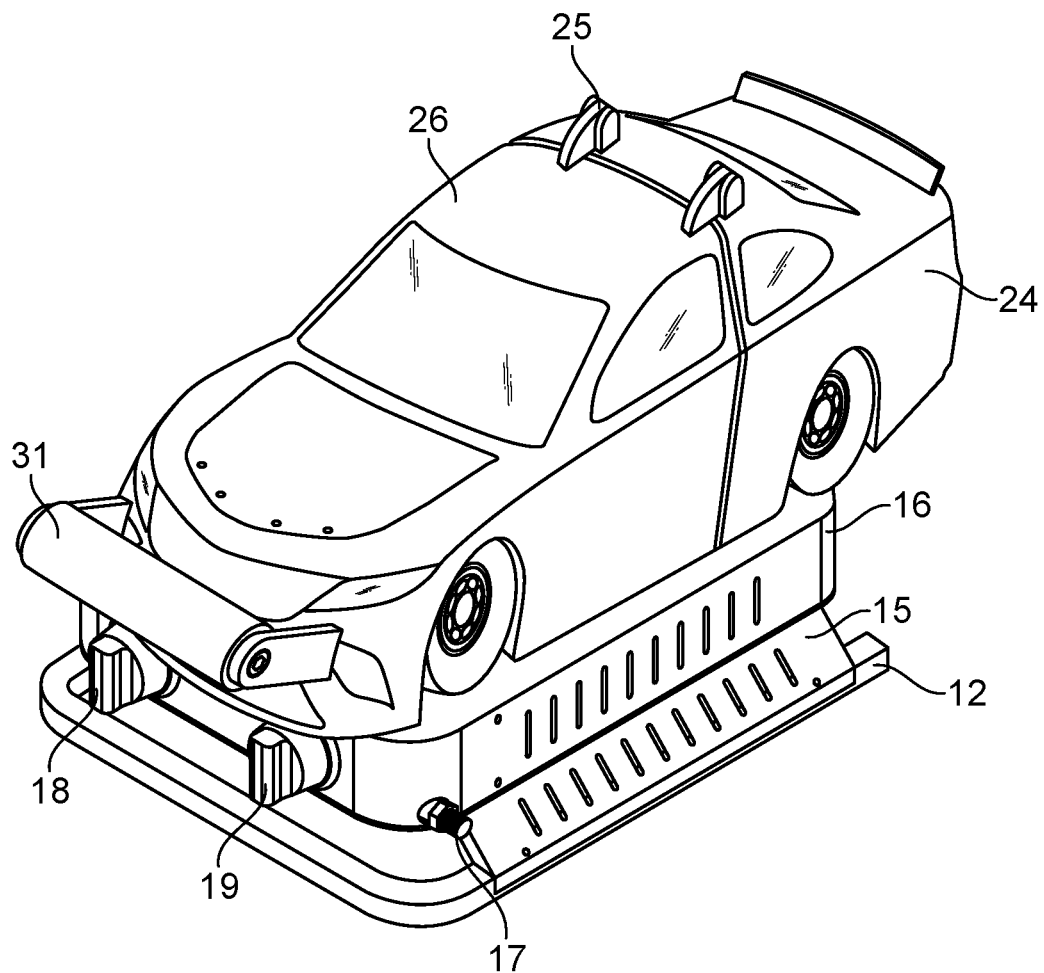
FIG. 5 shows an alternative embodiment of the interchangeable grill head.

FIG. 5 illustrates an alternative embodiment of the interchangeable grill lid 20. The grill 10 is comprised of a U-shaped base 12 mounted using a slotted riser plate 15 attached to grill body 17. The grill body 16 includes temperature control knobs 18 and 19 and a lighter switch 17. Affixed on top of grill body 16 is grill lid 20. Grill lid 20 comprises the grill lid base 23, not shown, the mascot base or grill lid lower section 24, and the mascot head or grill lid upper section 26. The grill lid upper section 26 is connected to the grill lid lower section by hinge assembly 25. The grill lid 20 has a grill lid handle 31 to act as a lever to open and shut the hinge assembly 25. This alternative embodiment does not need, but may include, a clamp latch assembly in between temperature control knobs 18 and 19.

With respect to the above description, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

It will be recognized by those skilled in the art that changes or modifications may be made to the above described embodiment without departing from the broad inventive concepts of the invention. It is understood therefore that the invention is not limited to the particular embodiment which is described, but is intended to cover all modifications and changes within the scope and spirit of the invention.

I claim:

1. A grill comprising:
   a grill base having a grill body;
   a plurality of base edges on an upper portion of the grill body, the plurality of base edges having a plurality of base fastening points and a base lip located along the top edge of the plurality of base edges;
   a detachable grill lid assembly comprising a lid base, a lower lid body, and an upper lid body, wherein the detachable grill lid assembly has a hinge assembly connecting the lower lid body to the upper lid body and;
   the lid base having a plurality of lid edges on a lower portion of the lid base, the lid edges having a plurality of lid fastening points and a lid lip located along the top edge of the plurality of base edges;
   the plurality of base edges configured to be placed adjacent to the plurality of lid edges with the lid lip resting on the base lip and the plurality of base fastening points mating with the plurality of lid fastening points;
   the grill lid having a hole formed by the lid base and lower lid body which creates an opening for grilling and the hole is covered by the upper lid body when in a closed position;
   a grill grate that is configured to fit within the lower lid body hole;
   the lid base having one or more flat areas adjacent the base edges and connecting at least one of the base edges to the lower lid body; and
   a releasable latch assembly fastening the upper lid body to the grill base.

2. The grill of claim 1, the upper lid body having a handle to lift the hinged upper lid body off of the hinged lower lid body.

3. The grill of claim 2, the handle configured to be part of the releasable latch assembly.

4. The grill of claim 3, the handle in the shape of a ring.

5. The grill of claim 1, the upper lid body and the lower lid body when mated from the shape of a head of a mascot.

6. The grill of claim 1, the upper lid body and lower lid body when mated together form the shape of a car.

* * * * *